United States Patent [19]

Montabert

[11] Patent Number: 4,508,017

[45] Date of Patent: Apr. 2, 1985

[54] FLUID-CONTROL SYSTEM FOR A HYDRAULIC PERCUSSION INSTRUMENT

[75] Inventor: Roger Montabert, Lyons, France

[73] Assignee: Etablissements Montabert, Saint-Priest, France

[21] Appl. No.: 398,237

[22] Filed: Jul. 14, 1982

[30] Foreign Application Priority Data

Jul. 17, 1981 [FR] France ................................ 81 14304

[51] Int. Cl.³ ........................... B25D 9/06; F16F 9/19

[52] U.S. Cl. ........................................ 92/85 B; 92/86; 92/134; 173/114; 173/116; 173/134

[58] Field of Search ..................... 92/86, 85 B, 10, 60, 92/143, 80, 83, 134; 173/114, 116, 134; 138/26, 30, 31

[56] References Cited

U.S. PATENT DOCUMENTS

| | | | |
|---|---|---|---|
| 1,962,168 | 6/1934 | Andrus | 138/36 |
| 2,808,070 | 10/1957 | Malsbary | 138/26 |
| 3,905,278 | 9/1975 | Ourdouille | 92/80 |
| 3,972,396 | 8/1976 | Bochnak | 92/86 |
| 4,073,350 | 2/1978 | Eklof et al. | 173/134 |

FOREIGN PATENT DOCUMENTS

| | | | |
|---|---|---|---|
| 1901776 | 8/1970 | Fed. Rep. of Germany | 92/162 |
| 1431835 | 2/1966 | France . | |
| 2045289 | 2/1971 | France . | |
| 1142324 | 2/1969 | United Kingdom | 92/134 |

*Primary Examiner*—Robert E. Garrett
*Assistant Examiner*—Scott L. Moritz
*Attorney, Agent, or Firm*—Karl F. Ross; Herbert Dubno

[57] ABSTRACT

A power cylinder of a hydraulic percussion implement, in whose bore a ram with an enlarged piston head is vertically reciprocable to strike a tool at the lower end of the bore, has a control chamber above the piston head alternately communicating with the high-pressure side and the low-pressure side of a source of hydraulic fluid, an annular recess in the bore being permanently or intermittently connected to high pressure acting upon the underside of the piston head. An annular drainage chamber formed by the bore at a lower level, disposed above an oil seal, collects liquid leaking down from that recess and returns it to the source. A pneumatic buffer lies in or communicates with that drainage chamber for absorbing hydraulic shocks generated when the ram strikes the tool.

8 Claims, 9 Drawing Figures

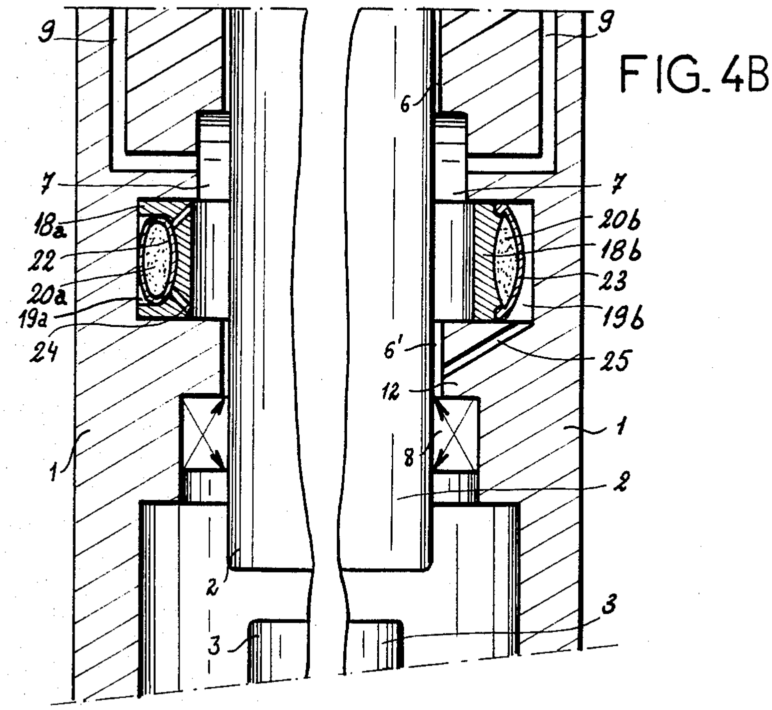
FIG. 4B
FIG. 4A
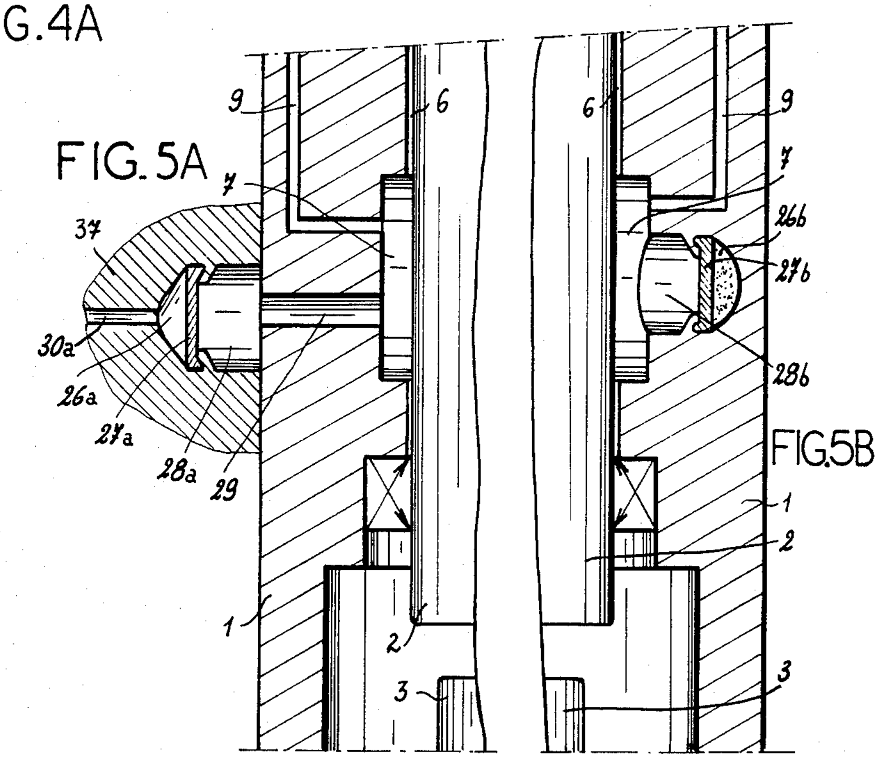
FIG. 5A
FIG. 5B

FLUID-CONTROL SYSTEM FOR A HYDRAULIC PERCUSSION INSTRUMENT

FIELD OF THE INVENTION

My present invention relates to a hydraulic percussion implement used, for example, as a rock crusher.

BACKGROUND OF THE INVENTION

A percussion implement of the type here contemplated has been disclosed, for example, in commonly owned French Pat. No. 1,431,835 and patent of addition No. 2,045,289. Reference in this connection may also be made to my copending application Ser. No. 396,806, filed July 9, 1982.

Such a percussion implement generally has a body designed as a power cylinder with a bore which in normal use is more or less vertical and has an open lower end forming a seat for a working tool, e.g. a drill or a chisel. The tool is impacted by a massive piston or ram reciprocable in the cylinder bore, this ram having a piston head received in an enlargement of the bore which is either permanently connected or intermittently connectable to a source of hydraulic liquid under pressure. The high-pressure liquid acts upon the annular underside of the piston head so as to drive the ram upward when the space thereabove, constituting a control chamber, is connected to the low-pressure side of the source; when that control chamber communicates with the high-pressure side, the resulting pressure differential drives the ram down into contact with the tool.

The reciprocation of the ram causes the leakage of hydraulic fluid (referred to hereinafter as oil) from the enlarged pressurized part of the bore toward the lower end of the arm through a surrounding annular clearance. It has already been proposed to surround that lower end with an oil seal and to dispose a drainage chamber, formed by an annular recess of the cylinder bore, between the oil seal and the enlargement connected or connectable to high pressure. The drainage chamber has an outlet through which leakage oil is returned to the low-pressure side of the source, usually by way of flexible tubing.

When the ram strikes the tool, a backward-propagating pressure wave is generated which is partly absorbed by the cylinder body and transmitted thereby to the drainage chamber. The shock of the impact momentarily presses on the oil in that chamber while the ram tends to broaden as a result of the blow, thus constricting the leakage path and contributing to the pressurization of the chamber. That brings about a sharp rise in oil pressure which is not immediately absorbed by the intake side of the source and is followed by a sudden drop or cavitation; this phenomenon, recurring with every blow of the ram, is rather detrimental to the oil seal and to the connection from the drainage chamber to the source.

OBJECT OF THE INVENTION

The object of my present invention, therefore, is to provide means in such a hydraulic percussion implement for obviating the above-discussed drawback.

SUMMARY OF THE INVENTION

I realize this object, in accordance with my present invention, by the provision of a pneumatic buffer disposed substantially at the level of the drainage chamber and in communication therewith for absorbing hydraulic shocks generated by the impact of the ram upon the tool.

As more particularly described hereinafter, such a buffer advantageously comprises an enclosure for a volume of gas, this membrane separating that volume from the drainage chamber. If the gas contained in the enclosure is air, its interior may communicate with the surrounding atmosphere through a restricted passage. Alternatively, the enclosure may form an airtight seal around the cushion of air or some other gas confined therein.

BRIEF DESCRIPTION OF THE DRAWING

The above and other features of my invention will now be described in detail with reference to the accompanying drawing in which:

FIGS. 4A and 4B are two other analogous views relating to two further embodiments; and FIGS. 5A and 5B are yet another pair of such views, pertaining to an additional embodiment and a modification thereof.

SPECIFIC DESCRIPTION

Figure 1:
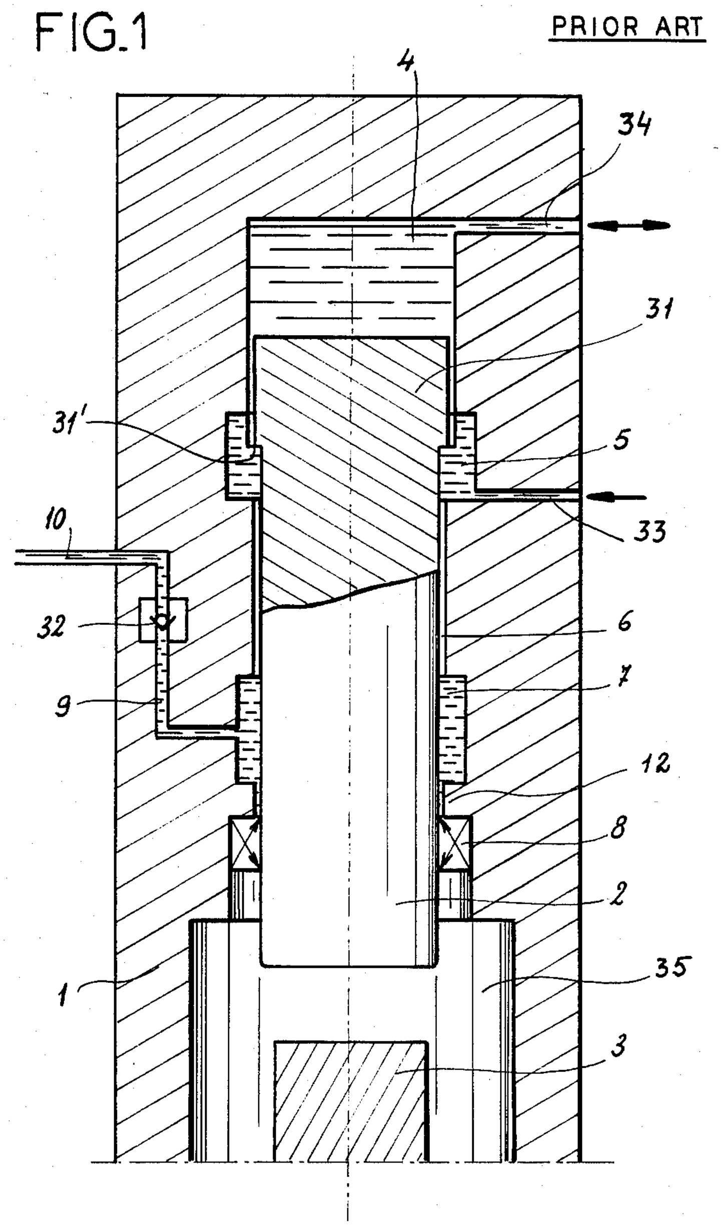
FIG.1 PRIOR ART
FIG. 1 is a somewhat diagrammatic view, in axial section, of a representative part of a conventional hydraulic percussion implement.

FIG. 1 shows the body 1 of a conventional hydraulic percussion implement, this body constituting a power cylinder with an axial bore accommodating a ram 2 which is vertically reciprocable therein and forms a piston head 31 received in a wider upper portion of the cylinder bore. The wider bore portion forms a control chamber 4 above piston head 31 and an annular enlargement 5 at a lower level, this enlargement communicating by way of a port 33 with the high-pressure side of a nonillustrated source of hydraulic fluid (oil) whereby the annular underside 31' of the piston head is constantly under upward pressure. Another port 34, opening into control chamber 4, can be alternately connected to the high-pressure and the low-pressure side of the oil supply; this connection may be established by an external reversing valve, not shown, or by a likewise nonillustrated distributor above chamber 4 as disclosed in the aforementioned French patents and also in my copending application Ser. No. 396,806 referred to. Port 33 could also be off from high pressure during times when ram 2 is propelled downward.

The stem of ram 2 slidably fits in the cylinder bores with a small annular clearance 6 which is lined with a film of oil to facilitate its reciprocation. Some of this oil continuously leaks down into a drainage chamber 7, also formed as a radially enlarged recess of the cylinder bore, which is bounded at its lower end by an internal collar 12 and is fluidically separated from a wider lower end 35 of the cylinder bore by an oil seal schematically indicated at 8. A shank 3 of a tool not further illustrated, rising into the widened bore portion 35, is periodically impacted by the ram 2 when the implement is in operation. In contrast to chamber 4 and enlargement 5, drainage chamber 7 is hydraulically ineffectual since it is not bounded by any transverse shoulder of ram 2.

Drainage chamber 7 has an outlet 9 which is connected via a conduit 10 to the low-pressure side of the oil supply, e.g. a sump, and contains a check valve 32 preventing any return flow into that chamber. When the ram 2 strikes the tool shank 3, its momentary radial expansion obstructs the clearance 6 while the reaction force of a workpiece—e.g. a rock or piece of pavement being fragmented—is partly translated into a backward-propagating pressure wave transmitted to the cylinder 1 through a nonillustrated collar on the tool shank resting against the lower end of that cylinder. Such a shock wave, as explained above, abruptly pressurizes the oil in chamber 7 which cannot escape fast enough through outlet 9 or through the substantially blocked clearance 6. This tends to impair the fluidtightness of the oil seal 8 and of the connection 10 between outlet 9 and the low-pressure side of the oil supply.

Figure 2A:
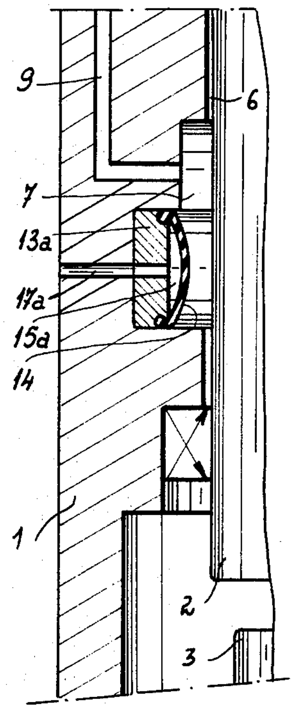
FIG. 2A is a view similar to FIG. 1, showing a portion of the implement equipped with a pneumatic buffer according to my invention.

In accordance with my present invention, and as particularly illustrated in FIG. 2A, the hydraulically ineffectual drainage chamber 7 is radially enlarged to accommodate a metallic ring **13*a* centered on the cylinder axis and an annular membrane 14 of convex curvature secured to the inner surface of that ring so as to define therewith a space 15*a* filled with air. Space 15*a* communicates with the surrounding atmosphere through a restricted passage 17*a*. Under the low pressure normally prevailing in chamber 7, membrane 14 retains its illustrated convexity; when the impact of the ram 2 upon the tool shank 3 generates the aforedescribed shock wave, membrane 14 is temporarily flattened to absorb the sharp pressure rise while the air in space 15*a* is compressed and partly escapes through passage 17*a***. As the shock wave passes, the membrane regains its normal shape and prevents cavitation.

Figure 2B:
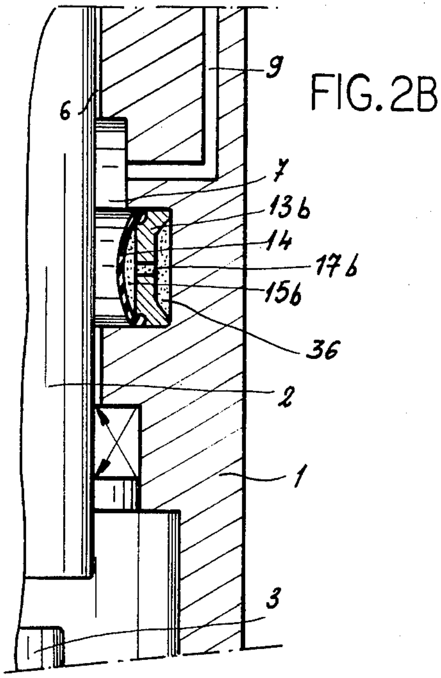
FIG. 2B is a view similar to that of FIG. 2A, showing an opposite portion of the implement with a slightly modified pneumatic buffer.

The pneumatic buffer shown in FIG. 2B is similar to that of FIG. 2A, except that ring **13*a* has been replaced by a ring 13*b* which defines with the peripheral wall of chamber 7 an annular channel 36 communicating with a space 15*b* inside the membrane by way of a narrow opening 17*b* in ring 13*b*. The enclosure encompassing space 15*b* and channel 36 is filled with air or some other gas under low pressure, some of the gas present in space 15*b* being forced into channel 36 when the membrane is more or less flattened by a pressure rise in chamber 7**.

Figure 3A:
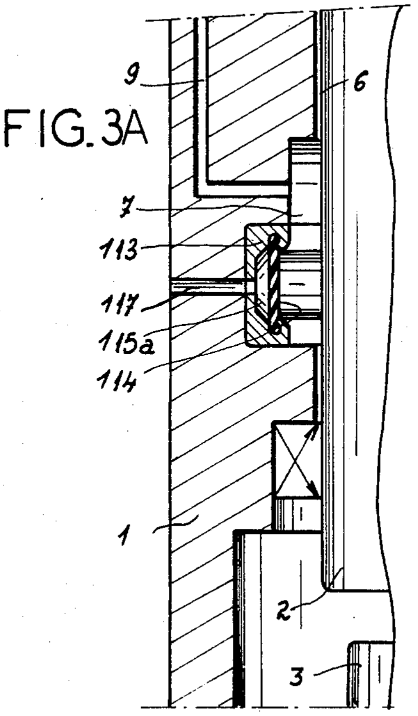
FIGS. 3A and 3B are a pair of views analogous to those of FIGS. 2A and 2B, representing other embodiments of my invention.

FIG. 3A shows a ring 113 which is concave toward chamber 7, its concavity being spanned by a normally cylindrical membrane 114 whose outward deformation compresses some of the air in a space **115*a* communicating with the atmosphere through a restricted passage 117**.

Figure 3B:
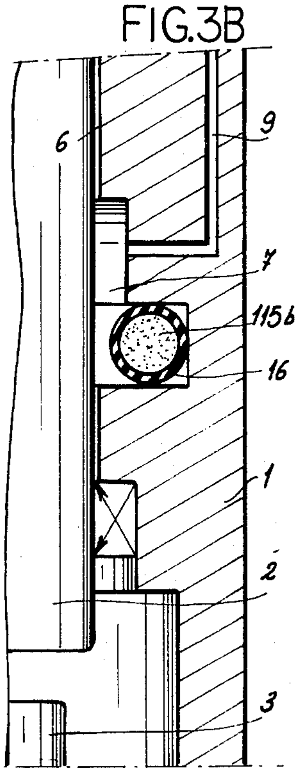

According to FIG. 3B, an annular space **115*b* filled with air or some other gas under low pressure is entirely enclosed by a tubular membrane 16** of toroidal shape.

In FIG. 4A I have shown a ring **18*a* whose outer periphery forms an annular channel 19*a* occupied by a tubular membrane 22 of elliptical cross-section enclosing a space 20*a* filled, as in FIG. 3B, with a gas at low pressure. This channel communicates with chamber 7 by way of passages 24 in ring 18*a* so that pressurized oil from chamber 7 can deform the membrane 22** and compress the gas contained therein.

FIG. 4B illustrates a similar arrangement wherein, however, a ring **18*b* is more widely separated from the peripheral wall of chamber 7 to form an annular chamber 19*b* accommodating an outwardly convex membrane 23 and communicating with a downward extension 6' by way of several passages 25 (only one shown) in the internal collar 12. Ring 18*b* and membrane 23 enclose an annular space 20*b*, again filled with gas under low pressure, which is compacted under oil pressure from chamber 7 communicated by way of passages 25 to channel 19*b***.

The combined cross-sectional area of passages 24 (FIG. 4A) or 25 (FIG. 4B) will be large enough to maintain only a negligible pressure differential between the drainage chamber 7 and the annular channel **19*a* or 19*b*** in all stages of operation.

FIG. 5A shows an external extension 37 of cylinder 1 forming a pocket **28*a* which communicates with drainage chamber 7 through a relatively wide duct 29 so as to be under essentially the same pressure. Pocket 28*a* is spanned by a flat membrane 27*a* sealing off a compartment 26*a* which is filled with air and communicates with the atmosphere through a restricted passage 30*a***.

A similar arrangement, shown in FIG. 5B, comprises a pocket **28*b* formed in the wall of cylinder 1 itself, a flat membrane 27*b* again sealing off the chamber 7 from a compartment 26*b* which in this instance is filled with gas at low pressure. If desired, however, compartment 26*b* could communicate with the atmosphere through a nonillustrated passage such as that shown at 30*a* in FIG. 5A; conversely, compartment 26*a*** of FIG. 5A could be entirely closed and filled with a low-pressure gas.

The embodiment of FIG. 2A and its modification of FIG. 2B are distinguished from the other embodiments in that the gas space **15*a* or 15*b* lies virtually within the drainage chamber itself. In FIGS. 3A and 3B that gas space lies in a recess separated from that chamber by a membrane, whereas in FIGS. 4A and 4B the separation is provided by a solid ring. According to FIGS. 5A and 5B, finally, the gas space is a pocket of limited angular extent as compared with an annular channel centered on the cylinder axis to form a peripheral boundary of drainage chamber 7** according to the preceding embodiments.

In all these instances, the pressure rise in the drainage chamber 7 will be minimized to an extent determined by the elasticity of the respective membrane and by the compressibility of the gas cushion separated by that membrane from the oil in the chamber.

I claim:

1. In a hydraulic percussion implement having a body with a cylindrical bore centered on a generally vertical axis, a ram reciprocable in said bore and provided with a piston head received in an enlargement of said bore connectable to a source of hydraulic liquid under pressure, said body forming a seat for a tool at a lower end of said bore to be impacted by said ram in a bottom position thereof, and seal means in said bore engaging a lower extremity of said ram, said bore being annularly recessed to form a hydraulically ineffectual drainage chamber at a level below said enlargement but above said seal means for collecting liquid leaking down alongside said ram, said drainage chamber having an outlet connected via a check valve to a low-pressure region, the combination therewith of a pneumatic buffer disposed in said body substantially at the level of and in communication with said drainage chamber in the vicinity thereof for absorbing hydraulic shocks generated by the impact of said ram upon said tool, said buffer comprising a flexible membrane forming at least part of an enclosure for a volume of gas and separating said volume from said drainage chamber.

2. The combination defined in claim 1 wherein said enclosure contains air and communicates through a restricted passage with the surrounding atmosphere.

3. The combination defined in claim 1 wherein said enclosure forms an airtight seal around said volume.

4. The combination defined in claim 1, 2 or 3 wherein part of said enclosure is a rigid wall.

5. The combination defined in claim 4 wherein said wall confronts said drainage chamber and has at least one aperture open thereto.

6. The combination defined in claim 1, 2 or 3 wherein said enclosure surrounds said drainage chamber as a peripheral boundary thereof, said membrane being annular and centered on said axis.

7. The combination defined in claim 1, 2 or 3 wherein said enclosure forms a pocket of limited angular extent laterally offset from said drainage chamber.

8. In a hydraulic percussion implement having a body with a cylindrical bore centered on a generally vertical axis, a ram reciprocable in said bore and provided with a piston head received in an enlargement of said bore connectable to a source of hydraulic liquid under pressure, said body forming a seat for a tool at a lower end of said bore to be impacted by said ram in a bottom position thereof, and seal means in said bore engaging a lower extremity of said ram, said bore being annularly recessed to form a drainage chamber at a level below said enlargement but above said seal means for collecting liquid leaking down alongside said ram, the combination therewith of a pneumatic buffer disposed substantially at the level of and in communication with said drainage chamber for absorbing hydraulic shocks generated by the impact of said ram upon said tool, said buffer comprising an enclosure for a volume of gas and separating said volume from said drainage chamber, said enclosure being formed in part by a flexible membrane and in part by a rigid wall which confronts said drainage chamber and has at leaast one aperture open thereto.

* * * * *